Jan. 6, 1970   R. SIMON ET AL   3,487,844
PIPELINING CRUDE OIL

Filed Jan. 3, 1966   5 Sheets-Sheet 1

INVENTORS
RALPH SIMON
CLAYTON D. McAULIFFE
WESLEY G. POYNTER
HARLEY Y. JENNINGS, JR.
BY
ATTORNEYS

Jan. 6, 1970  R. SIMON ET AL  3,487,844
PIPELINING CRUDE OIL
Filed Jan. 3, 1966  5 Sheets-Sheet 5
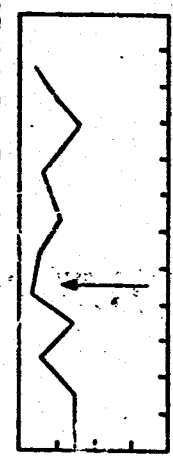
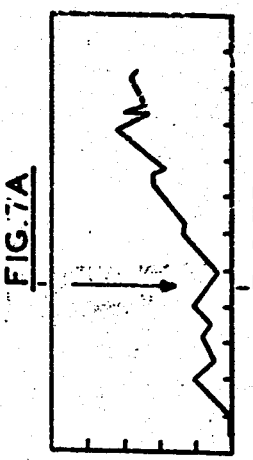
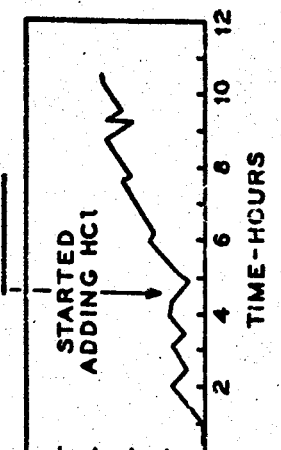
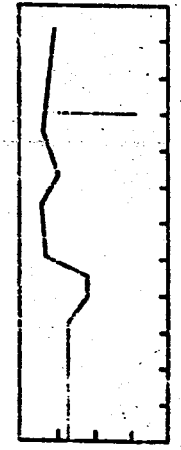
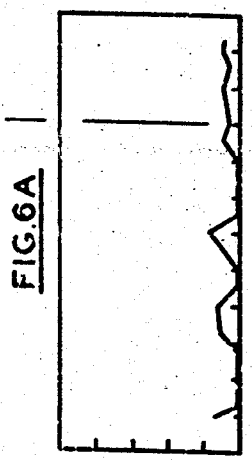
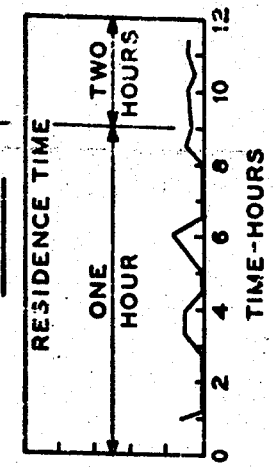
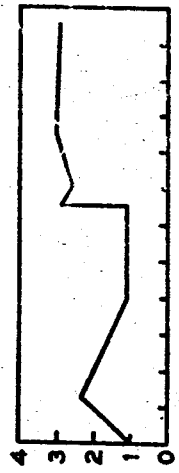
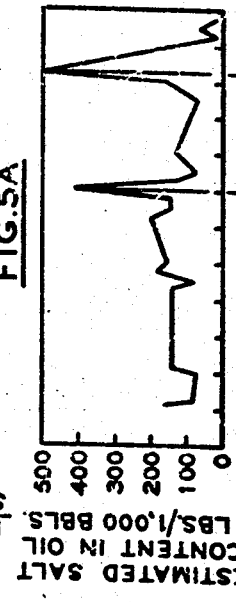
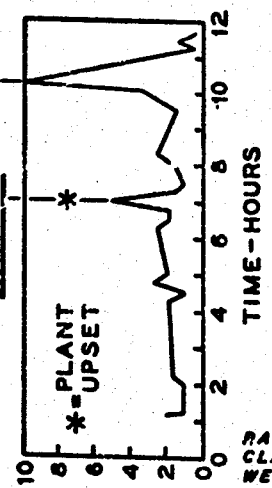
INVENTORS
RALPH SIMON
CLAYTON D. McAULIFFE
WESLEY G. POYNTER
HARLEY Y. JENNINGS, JR.
BY
ATTORNEYS United States Patent Office 3,487,844
Patented Jan. 6, 1970

3,487,844
PIPELINING CRUDE OIL
Ralph Simon, Whittier, Clayton D. McAuliffe, Fullerton, Wesley G. Poynter, Whittier, and Harley Y. Jennings, Jr., Fullerton, Calif., assignors to Chevron Research Company, San Francisco, Calif., a corporation of Delaware
Filed Jan. 3, 1966, Ser. No. 518,124
Int. Cl. F17d 1/16
U.S. Cl. 137—13    14 Claims

ABSTRACT OF THE DISCLOSURE

A method of transporting viscous crude oils by pipeline wherein water containing a base such as sodium hydroxide is mixed with the crude oil in the presence of an emulsifying agent so as to form an oil-in-water emulsion thereby facilitating the movement of the oil through the pipe.

---

This invention is directed to transporting viscous crude oils; and, more particularly, this invention is directed to methods of transporting viscous crude oils through pipelines in emulsified form.

There are many crude oils that are extremely viscous when produced and are thus quite difficult to transport. One of the methods used heretofore to transport such oils was shipping heated batch quantities, such as by truck. Various methods of pipelining extremely viscous crudes have also been attempted. The viscosities of the crudes so pipelined were reduced by adding a diluent to the viscous crude or by means of heating the oil before passing it through a pipeline. Since these methods are relatively expensive, the need for an inexpensive method of transporting viscous crudes is still required.

In accordance with the invention, it has been found that the viscosity of crude oils can be greatly reduced by contacting the crude with water and a base in the presence of an emulsifying agent for the viscous crude. By suitably agitating the crude and aqueous basic solution, an oil-in-water emulsion is formed. This oil-in-water emulsion is then moved through a pipeline. At a suitable location at the downstream end of the pipeline an emulsion-breaking agent is added to the emulsion. The oil and water are separated for further use.

In general, the oil-in-water emulsions of the invention contain by volume about 50 to 70 percent oil and 30 to 50 percent water based on the emulsion. The aqueous continuous phase of the emulsion contains the base in a concentration within about the range 0.002 N and 0.75 N. The viscosity of the emulsion can be varied by adjusting its water content, the viscosity being lower with increased water content and increased by raising the oil content.

The invention is particularly useful when applied to asphaltic crudes—for examples, the heavy California crudes—which, upon contact and agitation with a suitable aqueous basic solution, are converted into an oil-in-water emulsion. Accordingly, it has been found that the viscosity of the crude can be reduced by a factor of 100 to 1,000 that of the original viscous asphaltic crude by adding to the crude an aqueous solution of a base—for example, sodium hydroxide—to react with the saponifiable constituents of the crude to produce an oil-in-water emulsion. As hereinabove mentioned, the amount and concentration of the base solution for mixing with the crude may range in concentration from about 0.002 N to 1 N or higher and is such that the concentration of the base upon creation of the emulsion is in about the range 0.002 N to 0.75 N based on the total water present after emulsification; that is, the water not only contributed by the alkaline solution but also any connate water present in the oil that is to be emulsified to produce an emulsion containing about 50 to 70 percent oil and 50 to 30 percent water by volume based on the emulsion.

In this regard, it is contemplated that, for a particular crude oil that is desired to transport, lab tests will be done and the optimum concentration and amount of the basic solution will be determined. It is necessary that the concentration of the basic solution be adjusted to within a relatively narrow range, since if the concentration is too low emulsification will not occur or will be incomplete and if the concentration is too high inversion of the emulsion from oil-in-water to water-in-oil will occur with the resulting prohibitive increase in viscosity which may be higher even than the original viscosity of the oil.

The base used in forming the aqueous alkaline solution can be a metal alkaline hydroxide, such as sodium hydroxide, potassium hydroxide, and lithium hydroxide or ammonium hydroxide. In addition to the inorganic bases, it is also possible to use strong organic bases, such as the amines—for example, ethylamine, propylamine, triethanolamine—thus forming emulsifying amine soaps with the acid contained in the asphaltic group. Generally, because of cost, it is preferred to use a caustic solution formed of sodium hydroxide.

As mentioned, the invention is particularly useful when applied to asphaltic crudes that contain saponifiable constituents capable of forming with the base solution the effective emulsifying agent required in forming the oil-in-water emulsion. Examples of such crude oils are the naphthenic base crude oils, such as the heavy California crude oils, for example, those of the "Valley" (Kern County, Coalinga) and coastal crudes (Santa Maria); the heavy Venezuelan crudes, for example, Boscan; the heavy Mexican crudes, for example, the Ebano and Panuco type; the heavy crude oils of the Texas Gulf Coast; the asphaltic-containing crudes in Mississippi; the naphthenic oil from the Mid-Continent Fields.

Various crude oils have different susceptibilities to form the desired oil-in-water emulsions required to obtain the benefit of the present invention. Specifically, it is desirable to evaluate the crude oil for its ability to form the desired emulsion prior to mixing sodium hydroxide or other alkali metal hydroxide solutions with the crude to form the prescribed oil-in-water emulsion. Taking sodium hydroxide as representative, several examples of crude oils will be given below to indicate suitable concentration ranges to form a desirable oil-in-water emulsion. Generally, the emulsions are most readily formed by crude oils having high acid numbers. The emulsion is also more easily formed with fresh waters whose salt content is low. If the native or connate water from the formations producing oil has a high salt content, it is sometimes necessary either to supply greater quantities of fresh water from the surface or to remove some of the connate water from the oil.

Table 1 illustrates effective ranges of sodium hydroxide in weight percent concentration in the aqueous phase that have been used to emulsify samples of crude oil to form oil-in-water emulsions. The discontinuous oil phase was maintained at about 70 percent by volume to produce oil-in-water emulsions from crude oils over the given preferred ranges.

TABLE 1

| Crude oil: | NaOH conc., Wt. percent in water |
|---|---|
| Midway-Sunset A | 0.4–1.4 |
| Midway-Sunset B | 0.05–0.5 |
| Midway-Sunset C | 0.1–1.0 |
| West Coalinga A | 0.05–1.0 |
| West Coalinga B | 0.1–0.5 |
| Boscan | 0.05–0.3 |
| Casmalia | 0.1–0.6 |
| Cat Canyon | 0.1–1.0 |

While in general the alkaline material, such as sodium hydroxide, will be added as a preferred solution, there are certain oil-bearing formations in which the formation water has a sufficiently high alkali metal carbonate content to permit formation of alkali metal hydroxide when mixed with an alkaline earth metal hydroxide, such as calcium hydroxide, a relatively less expensive alkaline material, which reacts with the connate water to form insoluble alkaline earth metal carbonate and aqueous alkali metal hydroxide.

For example, in the Boscan field in Venezuela, formation water has a high sodium bicarbonate content—calcium hydroxide is locally available and inexpensive—while sodium hydroxide must be imported. The invention can be practiced in the Boscan field by mixing either a saturated solution of calcium hydroxide or a dilute dispersion of solid calcium hydroxide in water with the formation water to cause reaction-forming calcium carbonate precipitate and dilute aqueous sodium hydroxide which, when mixed with the oil, will cause the formation of an oil-in-water emulsion in accordance with the invention.

It is also advantageous with water that contains calcium or magnesium salts to add sodium carbonate along with the alkali metal hydroxide to form calcium carbonate or magnesium hydroxide. Even when these compounds do not form a precipitate, they are sufficiently inactivated so that they do not interfere with the reaction of the basic solution with the crude to form an oil-in-water emulsion.

With nonasphaltic crudes—for example, Minas and Red Wash crudes—that are nevertheless viscous because of the high paraffin content but contain little, if any, saponifiable material, it is possible to form the required oil-in-water emulsion by mixing a preformed emulsifying agent together with sufficient alkaline solution and the nonasphaltic crude. A suitable emulsifying agent can be obtained by extraction of certain low-gravity asphaltic crudes, such as those produced from numerous formations in California oil fields—for example, Casmalia, San Ardo, Midway-Sunset, West Coalinga and Poso Creek. It is also in accordance with the invention in situations where it is desired to pipeline both an asphaltic crude which will emulsify and a crude which will not emulsify upon the addition of a basic solution to mix the crudes in a predetermined proportion and then add the basic solution to the mixture to form an oil-in-water emulsion having desirable properties for pipelining.

The resulting low-viscosity, oil-in water emulsion is stable and can be pumped through a pipeline over a long distance. When the emulsion arrives at a refinery or tanker loading terminal, for example, the emulsion is broken and the water is separated from the oil. Since most refineries have an upper limit of 3 to 6 percent connate water in the delivered oil, it is necessary to provide an inexpensive and efficient method of breaking the emulsion and separating the oil and water. In accordance with the present invention, a salt solution is used under controlled conditions of temperature to break the emulsion in an efficient and inexpensive manner.

Further objects and advantages of the present invention will become apparent from the following detailed description read in view of the accompanying drawings which are made a part of this specification, and in which:

FIGURES 5a, 5b and 5c are charts illustrating data developed in breaking an emulsion in accordance with the invention;

FIGURES 6a, 6b and 6c are charts illustrating data developed in breaking an emulsion in accordance with the invention; and FIGURES 7a, 7b and 7c are charts illustrating data developed in breaking an emulsion in accordance with the invention.

Figure 1:
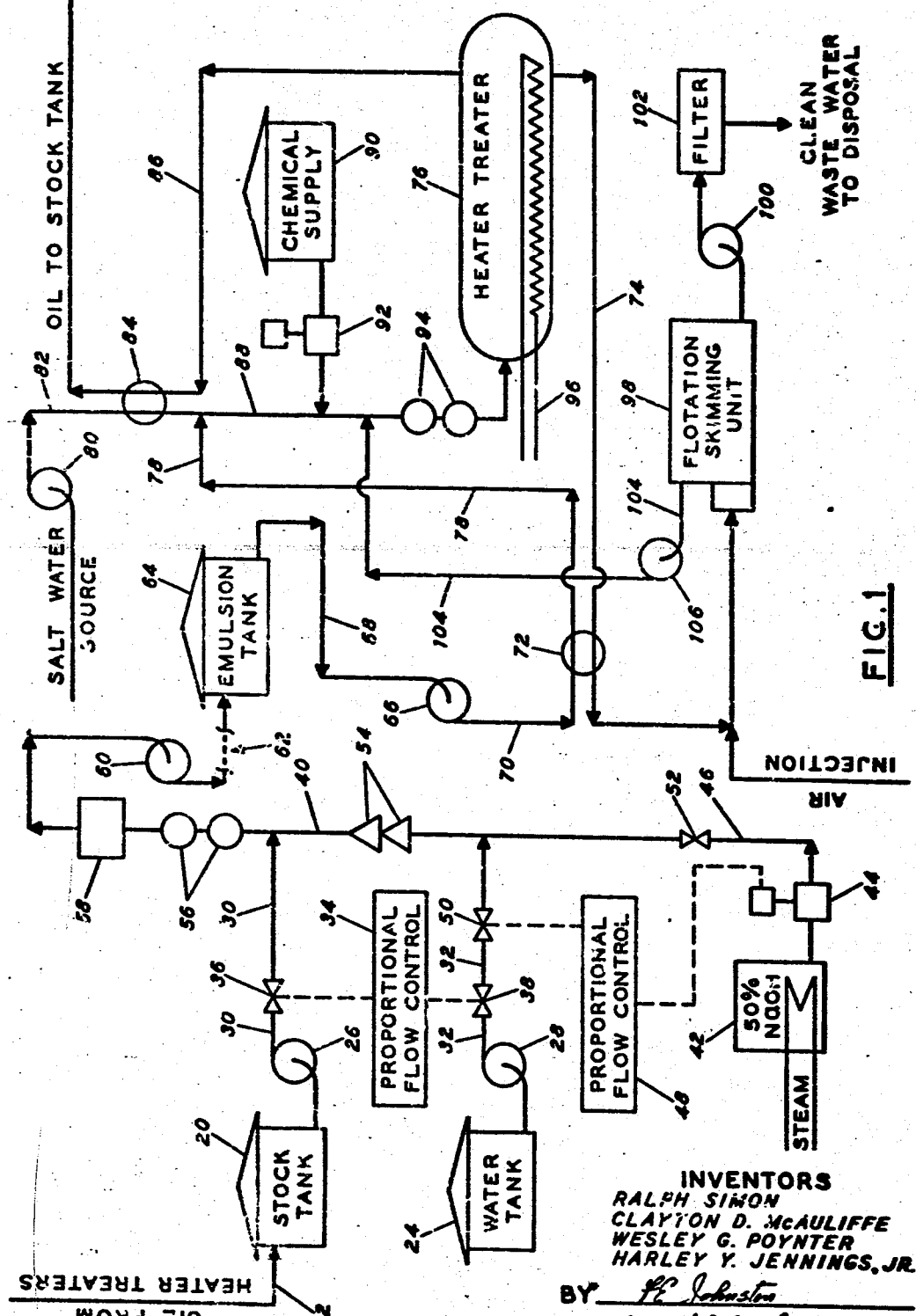
FIGURE 1 is a flow diagram illustrating the preferred embodiment of the present invention.

FIGURE 1 is a flow diagram illustrating the preferred embodiment of the present invention. The oil removed from the ground is flowed to a stock tank 20 which is normally used in oil field operations to temporarily store oil coming from the wells. In many instances, the oil coming from the wells will be heated by means of a heater treater, such as illustrated at 22, to reduce the connate water content of the produced oil and to allow the oil to flow more readily. In this regard, depending on the connate water content of a particular oil and the properties of the connate water, it may or may not be necessary or desirable to heat the produced oil to remove connate water.

A water tank 24 for supplying water for use in preparing an emulsion in accordance with the present invention is connected by suitable piping for mixing with oil from the stock tank. The relative "freshness" of the water which may be needed for use in forming a suitable oil-in-water emulsion depends on the particular oil to be emulsified and the amount of formation water included with the oil. In certain oils, a water having very low salt content is required for proper emulsification. In other oils, salt water or even coproduced water can be used to form the emulsion. Table 2 illustrates the range of sodium hydroxide concentration and percent of coproduced water useful in emulsification of Santa Maria Valley crude oils.

TABLE 2.—RANGE OF SODIUM HYDROXIDE CONCENTRATIONS WHICH PRODUCE 70 PERCENT OIL-IN-WATER EMULSIONS WITH SANTA MARIA VALLEY CRUDE OILS

| Field | Lease | Well | Coproduced Water in Crude, Percent | Percent NaOH in Water Phase Which Gives Good Oil-in-Water Emulsions |
|---|---|---|---|---|
| Casmalia | Casmalia Fee | 14 | 6.5 | 0.2–0.5 |
| Do | do | 21 | 12.1 | 0.2–0.3 |
| Do | Stock Tank Oil | | 1.5 | 0.05–0.5 |
| Do | Peshine | | 0.8 | 0.1–0.5 |
| Do | Pesuine A | 3-A | 4.0 | 0.2–0.5 |
| Cat Canyon | Harbordt | 87 | 7.7 | 0.2–1.0 |
| Do | Williams Holding | 6,125 | 2.8 | 0.1–1.0 |
| Do | G.W.P. | 6,824 | 15.7 | 0.2–0.5 |
| Los Alamos | Getty-Bell | 22 | 6.9 | (1) |
| Zaca | Chamberlin | 12 | 20.4 | (1) |
| Do | Carranza | 1 | 19.6 | 0.1–0.2 |

1 Did not emulsify.

Suitable pumps 26 and 28, respectively, are used to flow the water and oil through lines 30 and 32 to a proportional flow control device 34 which utilizes suitable valves 36 and 38 to provide for flow of predetermined amounts of oil and water in a common mixing line 40. Prior to mixing the water with the oil, a predetermined amount of base—for example, sodium hydroxide—from a suitable source 42 is mixed with the water. A metering pump 44 is used to move the sodium hydroxide through line 46. A proportional flow control means 48 adjusts the flow of water and base through suitable valves 50 and 52 on lines 32 and 46. A line mixer 54 is used to insure the proper mixing of the caustic and water prior to flowing it into mixing line 40. Downstream of the oil and basic solution mixing point, power mixers 56 are used to mix the basic solutions and oil to create an oil-in-water emulsion having desirable properties and viscosity. A viscosity high level alarm instrument 85 may be positioned in the line downstream of mixers 56 to sense and control undesirably high oil-in-water viscosities. As indicated above, it is of critical importance to maintain the basic solutions within limits because too little base will result in incomplete emulsification while too much base will cause inversion of the emulsion with an attendant increase in viscosity.

Figure 2:
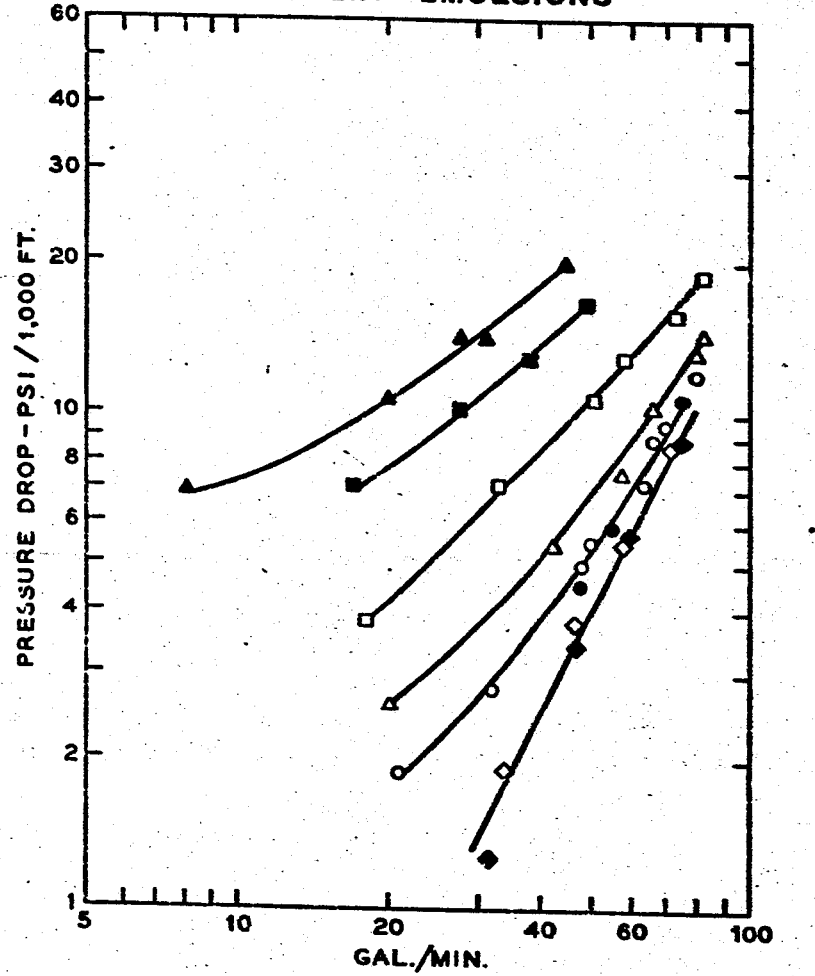
FIGURE 2 is a chart illustrating the pressure drop in a pipeline when pumping an emulsion in accordance with the invention.
Figure 3:
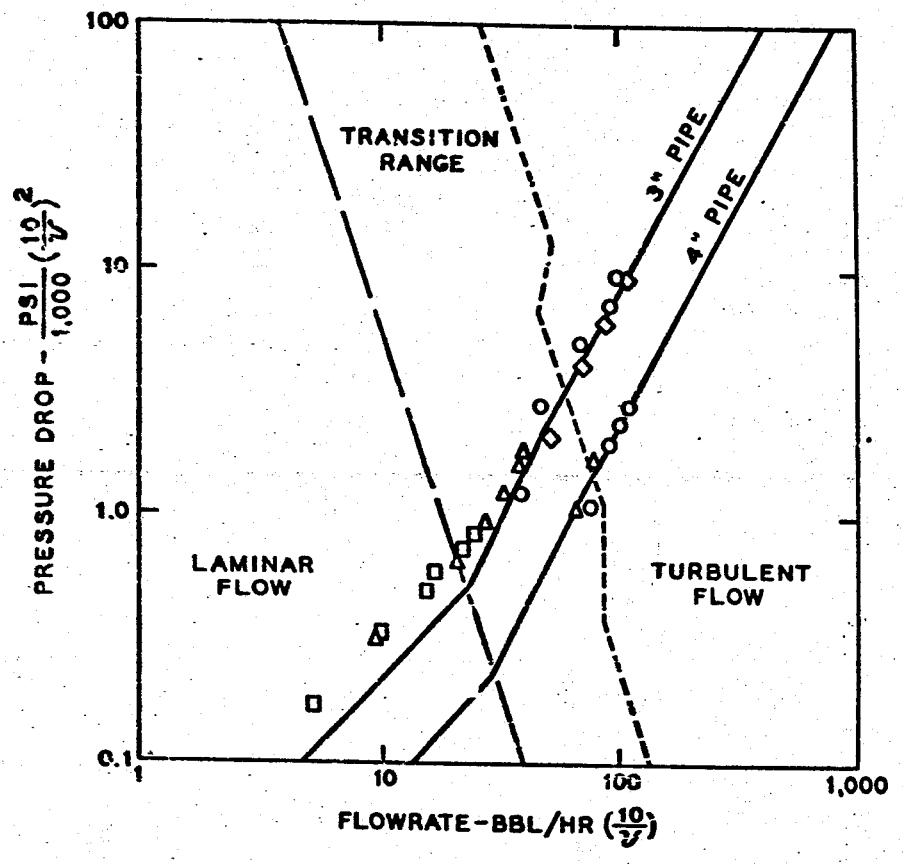
FIGURE 3 is a chart comparing the flow properties of an emulsion formed in accordance with the invention with a theoretical fluid.
Figure 4:
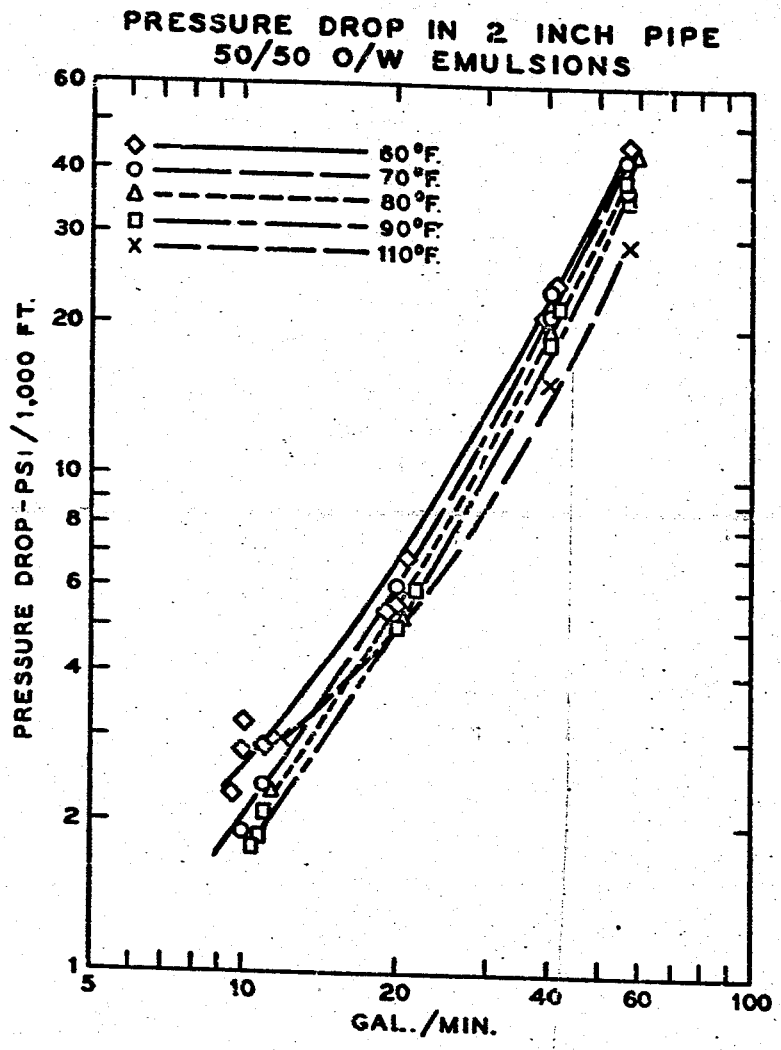
FIGURE 4 is a chart illustrating the pressure drop in a pipeline when pumping an emulsion in accordance with the invention.

The suitably prepared emulsion is now moved by pipeline pumps 60 through any desirable length of pipeline indicated at 62 to emulsion storage tank 64 at the downstream end of the pipeline. Any number of pipeline pumps, such as pump 60, may be used since the emulsion prepared in accordance with the present invention is stable and not affected by repetitive pumping. FIGURES 2-4 show properties of emulsion formed in accordance with the present invention during movement through pipelines. Specifically, FIGURE 2 has a number of curves relating pressure drop to flow rate for emulsions of Casmalia crude. The various emulsions were formed by using from 0.10 percent to 0.15 percent sodium hydroxide based on total water. The emulsions were aged as indicated to demonstrate that the emulsions are still easily pumpable after periods of inactivity. FIGURE 3 illustrates the flow properties of a number of Casmalia oil-in-water emulsions and compares them to a theoretical 10 cs. Newtonian fluid. FIGURE 4 illustrates the effect of temperature on flow rate and pressure drop for a Casmalia oil-in-water emulsion.

Again referring to FIGURE 1, it is often desirable to break the oil-in-water emulsion and to separate the oil from the water before moving the oil from the emulsion storage tank 64 to a refinery or to a ship. In this regard, the upper limit for the water content in the oil is usually set from about 3 to 6 percent by weight. In accordance with the preferred form of the invention, the oil-in-water is moved from the emulsion storage tank 64 by means of pump 66 through lines 68 and 70 to heat exchanger 72 for preheating. The oil is preheated to a temperature above about 200° F. and preferably above 220° F. The heating fluid for heat exchanger 72 in the embodiment illustrated is supplied through line 74 and is the hot effluent from a suitable heater treater 76. The hot oil-in-water emulsion is then moved through line 78 and is mixed with salt water entering the system through pump 80 and line 82. Saline solutions having a dissolved solids content of from 15,000 to 40,000 p.p.m. may be used. In accordance with the invention, the salt water is preferably seawater having a dissolved salt content of from about 30,000 to about 35,000 p.p.m. The seawater is preheated to above 150° F. and preferably to above 175° F. in heat exchanger 84 prior to being mixed with the oil-in-water emulsion. The hot fluid is the oil effluent from heater treater 76 and is supplied through line 86.

The seawater and oil-in-water emulsion are mixed in a common mixing line 88 in a ratio of emulsion to seawater of about 3 to 1. Emulsion/seawater ratios of about 2½ to 1 to 3½ to 1 for 60/40 oil-in-water emulsions are suitable. Lower ratios are less economical and do not produce subsequently better results. Higher ratios result in incomplete demulsification. For 50/50 oil-in-water emulsions, an emulsion/seawater ratio of 3 to 1 is preferred. Downstream in mixing line 88, a small amount of a suitable treating chemical is preferably added. One such suitable treating agent is CHEM-O-LENE 476 which may be kept in chemical supply vat 90 and moved in the flow line 88 by means of a metering pump 92. Other well-known chemicals are also available. The treating chemical is preferably used in the amount of about 1 gallon per 100 barrels of treated fluid. Power mixers 94, located downstream in line 88, provide complete mixing of the emulsion and treated seawater prior to flowing the mixture into the heater treater 76. In the heater treater 76, the mixture is heated under pressure to promote the complete separation of oil from water.

A suitable heating source, such as steam unit 96, is useful to raise the temperature in the heater treater to above 250° F. and preferably to above 275° F. The pressure in the heater treater is maintained above 50 p.s.i.g. and preferably above 80 p.s.i.g. The oil and water separate in the heater treater. The water is flowed through line 74 to a flotation skimming unit 98 for complete removal of the oil from the water prior to disposing of the water by means of pump 100 through filter 102. The residual oil from the flotation skimming unit is moved from the unit through line 104 by means of pump 106 and is returned to the system through flow line 88. Alternatively, the residual oil, if it meets specification, may also be piped to the stock tank. The oil is removed from the heater treater 76 through line 86 to a stock tank for use as refinery stock or for further transportation.

A first demonstration to illustrate the advantages of this invention was done using Casmalia crude oil which has a viscosity of approximately 1,000,000 cs. at 70° F. Six batches (25 barrels each) of oil-in-water emulsion with different oil/water ratios were prepared and were circulated through 1,970 feet (equivalent corrected length) of three-inch pipe. The emulsions were made by first loading a tank with an appropriate amount of water and caustic and then adding the oil. Mixing was accomplished by circulating the tank with a pump. All but one of the emulsion batches were made with Casmalia stock tank oil which had been dried to less than three percent water in field heater treaters. The remaining batch included enough connate water to make up 25 percent of the total water.

Data for the runs in the three-inch line are shown in Tables 3 and 4 and in FIGURE 2. Data are corrected by a viscosity correction factor and compared with a theoretical 10 cs. Newtonian fluid in FIGURE 3. This figure can be used for line sizing. The 50/50 emulsions were very stable and showed no change of properties after five days. The 60/40 and 65/35 emulsions tended to thicken after several days. This was probably due to insufficient mixing and slight deficiencies in caustic strength which led to stratification into an oil-rich, oil-in-water emulsion layer over a water-rich, oil-in-water emulsion layer. The two layers mixed easily with only slight agitation, and stratification did not cause difficulty in starting up a line which had been idle for ten days.

As indicated above, one batch of emulsion of Casmalia crude was made using a mixture of 25 percent waste water and 75 percent fresh water (all the other batches were made with fresh water only) to demonstrate the feasibility of disposing of part of the field waste water in the emulsion pipeline process. The emulsion was good and maintained stability. However, 25 percent of the total water is about the maximum permissible waste water content in Casmalia crude because its high salt content (15,000 p.p.m.) prevents proper emulsification in larger proportions.

TABLE 3.—EMULSION PIPELINING CASMALIA CRUDE OIL FLOW DATA IN 3-INCH PIPE LOOP

| Vol. percent oil in emulsion | Age of emulsion | Wt. percent NaOH in water | Temp., °F. | Viscosity in cp. | G.p.m. in 3" pipe loop | ΔP Obs. across 3" pipe loop, p.s.i. | ΔP p.s.i./ 1,000 ft. |
|---|---|---|---|---|---|---|---|
| I. Stock Tank Oil/Fresh Water ||||||||
| 50 | | 0.10 | 90 | 10 | 69.5 | 18.9 | 9.6 |
| | | | | | 63.8 | 14.3 | 7.3 |
| | | | | | 48.3 | 9.9 | 5.0 |
| | | | | | 31.9 | 5.5 | 2.8 |
| 50 | 1 day old | | | 11 | 78.5 | 24.1 | 12.2 |
| | | | | | 65.5 | 17.8 | 9.0 |
| | | | | | 52.0 | 11.1 | 5.6 |
| | | | | | 25.7 | 3.7 | 1.9 |
| 50 | 5 days old | | | 11 | 75.3 | 21.3 | 10.8 |
| | | | | | 55.4 | 11.9 | 6.0 |
| | | | | | 48.3 | 9.0 | 4.6 |
| | | | | | 30.2 | 2.8 | 1.4 |
| 60 | | 0.10 | 87 | 29 | 57.5 | 15.7 | 7.7 |
| | | | | | 79.5 | 26.5 | 13.4 |
| | | | | | 82.0 | 28.7 | 14.6 |
| | | | | | 65.3 | 20.4 | 10.4 |
| | | | | | 42.0 | 10.9 | 5.5 |
| | | | | | 19.9 | 5.2 | 2.6 |
| 60 | 8 days old | | | 147 | 27.4 | 28.1 | 14.3 |
| | | | | | 19.9 | 21.2 | 10.8 |
| | | | | | 7.9 | 13.8 | 7.0 |
| | | | | | 44.5 | 40.0 | 20.3 |
| | | | | | 31.0 | 28.2 | 14.3 |
| 65 | | 0.15 | 107 | 47.5 | 82.0 | 37.4 | 19.0 |
| | | | | | 73.0 | 31.9 | 16.2 |
| | | | | | 51.0 | 21.3 | 10.8 |
| | | | | | 33.2 | 14.2 | 7.2 |
| | | | | | 17.7 | 7.5 | 3.8 |
| | | | | | 5.3 | 3.2 | 1.6 |
| | | | | | 57.5 | 26.0 | 13.2 |
| 65 | 5 days old | | 90 | 161 | 63.8 | 33.0 | 16.7 |
| | | | | | 57.7 | 25.9 | 13.1 |
| | | | | | 27.5 | 20.0 | 10.0 |
| | | | | | 16.8 | 14.2 | 7.2 |
| II. Stock Tank Oil/75% Fresh Water, 25% Waste Water ||||||||
| 50 | | 0.15 | 95 | 9.5 | 71.7 | 17.0 | 8.6 |
| | | | | | 57.6 | 10.8 | 5.5 |
| | | | | | 46.5 | 7.3 | 3.7 |
| | | | | | 33.6 | 3.8 | 1.9 |
| 50 | 2 days old | | 92 | 10 | 75.0 | 17.3 | 8.8 |
| | | | | | 59.3 | 11.4 | 5.8 |
| | | | | | 46.0 | 6.5 | 3.3 |
| | | | | | 31.4 | 2.5 | 1.3 |

Table 4 illustrates a Harbordt lease California crude pipelined in emulsified form. The emulsion is a 50/50 oil-in-water emulsion using a .10 percent NaOH in water as the external phase. The emulsion was slightly lean on caustic and partially stratified but was of generally good quality and was suitable for emulsion pipelining.

emulsion was made in two batches of 500 barrels each and was pumped through 2½ miles (13,260 feet) of four-inch line. Whenever possible, the emulsions were permitted to stand in the line several days to test stability under simulated pipeline down conditions. The emulsions were made batchwise by first loading a tank with water

TABLE 4.—EMULSION PIPELINING CASMALIA CRUDE OIL FLOW DATA IN 3-INCH PIPE LOOP

| Vol. percent oil in emulsion | Wt. percent NaOH in water | Temp., °F. | Viscosity in cp. | G.P.M. in 3" pipe loop | ΔP Obs. across 3" pipe loop, p.s.i. | ΔP p.s.i./ 1,000 ft. |
|---|---|---|---|---|---|---|
| Harbordt Oil/Fresh Water |||||||
| 50 | 0.10 | 91 | 34 | 78.9 | 31.0 | 15.8 |
| | | | | 61.1 | 21.0 | 10.7 |
| | | | | 47.4 | 12.0 | 6.1 |
| | | | | 15.4 | 9.0 | 4.6 |

Table 5 illustrates the pipelining of an emulsified Casmalia crude oil in a four-inch pipeline. The oil-in-water and caustic and then adding the oil. Mixing was accomplished by circulating the tank with a pump.

TABLE 5.—EMULSION PIPELINING CASMALIA CRUDE OIL FLOW DATA IN 4-INCH PIPELINE 50/50 STOCK TANK OIL/FRESH WATER

[I. Viscosity Data]

| Sample No.: | Place | Remarks | Data From Fann Viscometer | |
|---|---|---|---|---|
| | | | C.p.s. | °F. |
| 1 | Casmalia | After 5 hours mixing | 32 | 91 |
| 2 | Northam | After setting over weekend | 38 | 83 |
| 3 | do | During mixing | 30.5 | 72 |
| 4 | McNally | Top of tank after standing overnight | 26 | 85 |
| 5 | do | Bottom of tank | 26.5 | 85 |
| 6 | Northam | After flowing through pipeline from McNally | 22 | 92 |
| 7 | McNally | After flowing through pipeline from Northam | 24 | 92 |
| 8 | Northam | After standing overnight | 23.5 | 83 |

[II. Rate v. ΔP for Emulsion Flow in 4" Line 13,262 Ft. Long]

| | Gage Readings, p.s.i.g. | | Pressure Drop | |
|---|---|---|---|---|
| | Northam | McNally | P.s.i. | P.s.i./1,000 ft. |
| Bbls./hour: | | | | |
| 263 | 30 | 198 | 212 | 16.0 |
| 200 | 201 | 30 | 127 | 9.6 |
| 256 | 35 | 200 | 211 | 15.9 |
| 177 | 141 | 20 | 77 | 5.8 |

A satisfactory method of separating the Casmalia oil-in-water emulsion into dry oil and clear waste water at a terminal to provide a dry oil with less than 3 percent water cut and clear waste water was obtained by the methods set out below. The apparatus was similar to that illustrated in FIGURE 1. Seawater was used as the principal emulsion-breaking agent. Emulsion, seawater and a small amount of treating chemical were mixed together and heated to about 275° F. The mixture was thoroughly agitated and passed through a small coalescer into a horizontal separator. In many cases, the use of coalescer is not necessary. Dry oil was withdrawn from the top of the separator and tanked. Waste water from the bottom of the separator was clarified before disposal by air blowing in a skimming pond and filtering through excelsior pads.

Approximately 150 laboratory scale screening tests were made to evaluate different emulsion-breaking solutions and to optimize the important process variables. These tests showed that ordinary seawater is effective and more economical than artificially prepared salt or acid solutions. It has been found that acid addition, while theoretically desirable to neutralize the caustic emulsifier, is practically undesirable because acid causes very rapid demulsification which tends to entrap emulsification water in the oil. FIGURES 5–7 illustrate results of these tests. Thorough emulsion/seawater mixing is essential. Satisfactory oil-in-water separation requires 1 to 2 hours residence of the seawater/emulsion mixture at about 275° F. and the addition of small amounts of treating chemical, such as CHEM-O-LENE 476 or other suitable agent.

Emulsion/seawater ratios of from about 2½ to 3½ to 1 for 60/40 oil-in-water emulsions are suitable. An emulsion/seawater ratio of 3 to 1 is the preferred ratio. Lower ratios than those set out above do not result in complete demulsification while higher ratios are not economical and do not produce significantly better results.

Additional demonstrations were conducted to show the advantages of the present method with various oils. The demonstrations are set out in Table 6.

The emulsion ratio was 50/50 oil/water and was prepared at 150° F. The caustic concentration is set out in the table for each oil. The emulsion breaking was done using seawater in a 2 to 1 ratio with the emulsion at 200° F. A small portion (1 part/2,000 parts emulsion) VISCO R–2–E was added to the emulsion during the emulsion-breaking stage. The water cuts for the crudes after separation are satisfactory.

A further demonstration was conducted to show a method sometimes available as an alternative to the preferred embodiment of the present invention. In this demonstration, the emulsion was a 70 percent oil-in-water emulsion formed by adding an aqueous 0.2 percent sodium hydroxide solution to Casmalia 14 crude. The emulsion thus formed was suitable for pipelining as described above. The technique used to break the emulsion included adding .3 grams of calcium chloride to each 100 grams of emulsion and bubbling $CO_2$ through the resulting mixture. Two ml. of $CO_2$ per minute were bubbled through the mixture for approximately four hours. The water cut of the separated oil was a satisfactory 1.95 percent.

We claim:

1. A method of transporting a viscous crude oil from a first location to a second location comprising contacting at a first location a viscous crude oil with water containing between 0.05 and 1.4 weight percent based on total water of a base in the presence of an emulsifying agent for the viscous crude oil, the ratio of said crude oil to said water being in the range of from between 50/50 to 70/30, agitating the crude and the water containing said base to form an oil-in-water emulsion, moving the oil-in-water emulsion through a pipeline from said first location to a second location, breaking the emulsion at said second location and separating the crude oil and the water.

2. The method of claim 1 further characterized in that the base is sodium hydroxide.

3. The method of claim 1 further characterized in that the emulsion breaking step includes bubbling $CO_2$ through the emulsion.

TABLE 6.—DEMONSTRATIONS OF EMULSION PREPARATION (50/50 OIL/WATER RATIO) AND EMULSION BREAKING WITH SEAWATER

| Crude | Gravity, °API | Oil visc. cp. at 70° F. | Water cut, percent | NaOH for emuls., wt. percent | Emulsion viscosity cp. at 70° F. | Percent $H_2O$ in Oil after breaking emulsion |
|---|---|---|---|---|---|---|
| Inglewood Investment Zone | 14.7 | 637 | Trace | 0.10 | 15 | 2.0 |
| Poso Creek | 13.7 | 5,100 | do | 0.12 | 71 | 4.1 |
| Inglewood Rubel Zone | 26.5 | 17 | do | 0.12 | 21 | 4.2 |

4. A method of transporting a viscous crude oil from a first location to a second location comprising contacting at a first location a viscous crude oil with water containing between 0.05 and 1.4 weight percent based on total water of a base in the presence of an emulsifying agent for the viscous crude oil, agitating the crude and the water containing said base to form an oil-in-water emulsion, moving the oil-in-water emulsion through a pipeline from said first location to a second location, mixing the emulsion with a saline solution having a dissolved solids content between 15,000 and 40,000 p.p.m. at a temperature in excess of 200° F. and in a ratio of emulsion to saline solution of from between 2 to 1 to 3½ to 1 to break the emulsion at said second location and separating the crude oil and the water.

5. The method of claim 4 where the base is sodium hydroxide.

6. The method of claim 4 where the saline solution is seawater.

7. The method of claim 6 where the emulsion and the seawater mixture is maintained at a temperature above 250° F. for at least one hour.

8. The method of claim 6 where the ratio of emulsion to seawater is 3 to 1.

9. A method of transporting a Casmalia type crude oil from a first location to a second location comprising contacting at a first location a Casmalia type crude oil with water and a base in the presence of an emulsifying agent for the said crude oil, the ratio of said crude to said water being in the range of from 50/50 to 70/30 and the base being sodium hydroxide in a concentration of from 0.05 to 0.6 percent by weight based on total water, agitating the crude and the water to form an oil-in-water emulsion, moving the oil-in-water emulsion through a pipeline from said first location to a second location, mixing the emulsion with seawater at a temperature in excess of 200° F. and in a ratio of emulsion to seawater of from between 2½ to 1 to 3½ to 1 to break the emulsion at said second location and separating the crude oil and the water.

10. The method of claim 9 where the emulsion is preheated to above 200° F. and the seawater is preheated to above 175° F. prior to mixing and the mixture is heated to about 275° F. for at least one hour.

11. The method of claim 9 where up to 25 percent of the water used in the emulsion is coproduced waste water.

12. The method of claim 9 where a small quantity of treating chemical is added to the seawater.

13. A method of transporting a Harbordt type crude oil from a first location to a second location comprising contacting at a first location a Harbordt type crude oil with water and a base in the presence of an emulsifying agent for the viscous crude oil, the ratio of said crude to said water being in the range of from 50/50 to 70/30 and the base being sodium hydroxide in a concentration of about 0.10 by weight percent based on total water, agitating the crude and the water to form an oil-in-water emulsion, moving the oil-in-water emulsion through a pipeline from said first location to a second location, mixing the emulsion with seawater at a temperature in excess of 200° F. and in a ratio of emulsion to seawater of from between 2 to 1 to 3½ to 1 to break the emulsion at said second location and separating the crude oil and the water.

14. A method of transporting viscous asphaltic crude oils through pipelines which comprises dispersing 50 to 70 volumes of oil in 50 to 30 volumes of aqueous alkali having a normal concentration of OH⁻ ion in the range about 0.2 to 1.5 normal to form an oil-in-water emulsion, passing the emulsion through the pipeline, withdrawing the emulsion from the pipeline and breaking the emulsion.

References Cited

UNITED STATES PATENTS

| | | | |
|---|---|---|---|
| 1,617,737 | 2/1927 | Averill | 252—348 |
| 1,847,413 | 3/1932 | Pollock | 252—348 |
| 3,006,354 | 10/1961 | Sommer | 137—13 |

FOREIGN PATENTS

| | | |
|---|---|---|
| 639,050 | 3/1962 | Canada. |
| 625,980 | 8/1961 | Canada. |

ALAN COHAN, Primary Examiner